(12) United States Patent
Shaik (10) Patent No.: US 10,880,331 B2
(45) Date of Patent: Dec. 29, 2020

(54) DEFEATING SOLUTION TO PHISHING ATTACKS THROUGH COUNTER CHALLENGE AUTHENTICATION

(71) Applicant: Cheman Shaik, Chicago, IL (US)

(72) Inventor: Cheman Shaik, Chicago, IL (US)

( * ) Notice: Subject to any disclaimer, the term of this patent is extended or adjusted under 35 U.S.C. 154(b) by 0 days.

(21) Appl. No.: 16/684,660

(22) Filed: Nov. 15, 2019

(65) Prior Publication Data
US 2020/0084237 A1  Mar. 12, 2020

(51) Int. Cl.
*H04L 29/06* (2006.01)
(52) U.S. Cl.
CPC ...... *H04L 63/1483* (2013.01); *H04L 63/0421* (2013.01); *H04L 63/083* (2013.01); *H04L 63/18* (2013.01)
(58) Field of Classification Search
CPC ............. H04L 63/1483; H04L 63/0421; H04L 63/083; H04L 63/18
USPC .......................................................... 726/7
See application file for complete search history.

(56) References Cited

U.S. PATENT DOCUMENTS

| | | | | |
|---|---|---|---|---|
| 5,838,302 A * | 11/1998 | Kuriyama | ........... | G06F 3/04883 345/173 |
| 6,708,223 B1 * | 3/2004 | Wang | ...................... | G06F 9/465 719/315 |
| 6,978,385 B1 * | 12/2005 | Cheston | .................. | G06F 21/31 340/5.85 |
| 7,051,209 B1 * | 5/2006 | Brickell | .................. | G06F 21/40 713/183 |

(Continued)

FOREIGN PATENT DOCUMENTS

| | | | | |
|---|---|---|---|---|
| CA | 2397934 A1 * | 8/2001 | ......... | H04L 63/1483 |
| JP | 2005092229 A * | 4/2005 | | |

(Continued)

OTHER PUBLICATIONS

Merli, Dominik, Frederic Stumpf, and Claudia Eckert. "Improving the quality of ring oscillator PUFs on FPGAs." In Proceedings of the 5th workshop on embedded systems security, pp. 1-9. 2010. (Year: 2010).*

(Continued)

*Primary Examiner* — Luu T Pham
*Assistant Examiner* — Walter J Malinowski
(74) *Attorney, Agent, or Firm* — Walter J. Tencza, Jr.

(57) ABSTRACT

A counter challenge authentication system and method is provided for authentication of online users of web applications. The authentication method involves a counter challenge from a user to a web application asking to provide certain information from one or more user details recorded at the time of registration. The user enters his password and logs into the web application only in case he receives the correct answer from the web application. This advanced authentication method protects online application users from phishing attacks. An incorrect answer to the user's challenge or inability of the web application to provide an answer to the challenge is a clear indication of a phishing attack, thereby alerting the user and stopping him from submitting his sensitive password information to phishers. The authentication method is computer independent and eliminates dependency on two-factor authentication, hardware tokens, client software installations, digital certificates, and user defined seals.

19 Claims, 12 Drawing Sheets

(56) References Cited

U.S. PATENT DOCUMENTS

| | | | | |
|---|---|---|---|---|
| 7,668,870 B1* | 2/2010 | Sykes | .................... | G06F 16/958 707/690 |
| 8,176,336 B1* | 5/2012 | Mao | .................... | H04L 9/006 713/189 |
| 8,661,254 B1* | 2/2014 | Sama | .................... | H04L 9/3215 713/168 |
| 8,793,776 B1* | 7/2014 | Jackson | .................... | H04W 4/023 726/7 |
| 8,844,012 B1* | 9/2014 | Chan | .................... | H04W 12/06 709/225 |
| 8,850,519 B2* | 9/2014 | Osborn | .................... | H04L 9/3226 726/2 |
| 8,869,269 B1* | 10/2014 | Ramzan | .................... | H04L 61/3025 726/22 |
| 9,172,697 B1* | 10/2015 | Holtz | .................... | H04L 63/083 |
| 10,320,624 B1* | 6/2019 | Roth | .................... | H04L 63/101 |
| 10,616,196 B1* | 4/2020 | Khitrenovich | .................... | H04L 63/08 |
| 2001/0037378 A1* | 11/2001 | Hirayama | .................... | H04N 21/8355 709/219 |
| 2002/0019753 A1* | 2/2002 | Boden | .................... | G06Q 10/10 705/3 |
| 2002/0042743 A1* | 4/2002 | Ortiz | .................... | G06Q 20/10 705/14.38 |
| 2002/0144056 A1* | 10/2002 | Tadokoro | .................... | G11B 15/6835 711/111 |
| 2004/0267737 A1* | 12/2004 | Takazawa | .................... | G06F 16/3338 |
| 2004/0268148 A1* | 12/2004 | Karjala | .................... | H04L 41/0856 726/15 |
| 2005/0086061 A1* | 4/2005 | Holtmanns | .................... | H04L 63/0407 705/51 |
| 2005/0228773 A1* | 10/2005 | Malik | .................... | G06F 21/6245 |
| 2005/0262062 A1* | 11/2005 | Xia | .................... | G06F 16/29 |
| 2006/0168221 A1* | 7/2006 | Juhls | .................... | H04L 63/08 709/225 |
| 2007/0016612 A1* | 1/2007 | James | .................... | G16C 20/40 |
| 2007/0250920 A1* | 10/2007 | Lindsay | .................... | G07F 7/1025 726/7 |
| 2008/0063273 A1* | 3/2008 | Shimodaira | .................... | G06K 9/348 382/171 |
| 2008/0098464 A1* | 4/2008 | Mizrah | .................... | G06F 21/36 726/5 |
| 2008/0114771 A1* | 5/2008 | Welingkar | .................... | H04L 41/0846 |
| 2009/0030893 A1* | 1/2009 | Copps | .................... | G06N 5/04 |
| 2009/0113543 A1* | 4/2009 | Adams | .................... | G06F 21/33 726/18 |
| 2009/0187986 A1* | 7/2009 | Ozeki | .................... | G06F 21/36 726/21 |
| 2009/0265773 A1* | 10/2009 | Schultz | .................... | G06F 16/9535 726/7 |
| 2009/0276839 A1* | 11/2009 | Peneder | .................... | G06F 21/31 726/8 |
| 2009/0284344 A1* | 11/2009 | Craymer | .................... | G06Q 20/341 340/5.54 |
| 2010/0028795 A1* | 2/2010 | Magome | .................... | G03G 9/0827 430/108.4 |
| 2010/0070759 A1* | 3/2010 | Leon Cobos | ....... | H04L 63/0853 713/155 |
| 2010/0125635 A1* | 5/2010 | Axelrod | .................... | G06F 21/42 709/206 |
| 2010/0185860 A1* | 7/2010 | Mishra | .................... | H04L 63/0869 713/169 |
| 2011/0016515 A1* | 1/2011 | Dhanakshirur | ......... | G06F 21/42 726/6 |
| 2011/0131222 A1* | 6/2011 | DiCrescenzo | ........ | H04L 9/0894 707/757 |
| 2011/0197070 A1* | 8/2011 | Mizrah | .................... | H04L 63/18 713/176 |
| 2011/0197266 A1* | 8/2011 | Chu | .................... | H04L 9/3228 726/5 |
| 2011/0208964 A1* | 8/2011 | Sama | .................... | H04L 9/3271 713/168 |
| 2011/0270837 A1* | 11/2011 | Raj | .................... | G06F 21/6227 707/737 |
| 2011/0277025 A1* | 11/2011 | Counterman | ........... | G06F 21/40 726/8 |
| 2012/0144442 A1* | 6/2012 | Chiang | .................... | H04N 21/4384 725/109 |
| 2012/0214442 A1* | 8/2012 | Crawford | .................... | H04M 1/673 455/411 |
| 2013/0124538 A1* | 5/2013 | Lee | .................... | H04L 63/105 707/749 |
| 2013/0159509 A1* | 6/2013 | Poese | .................... | H04L 43/00 709/224 |
| 2013/0160098 A1* | 6/2013 | Carlson | .................... | G06F 21/45 726/6 |
| 2013/0179954 A1* | 7/2013 | Bidare | .................... | H04L 63/18 726/7 |
| 2013/0305329 A1* | 11/2013 | Zhang | .................... | G06K 19/06028 726/6 |
| 2013/0318588 A1* | 11/2013 | Metzger | .................... | G06F 21/313 726/7 |
| 2014/0012740 A1* | 1/2014 | Carson | .................... | G06Q 30/0201 705/39 |
| 2014/0033327 A1* | 1/2014 | Conte | .................... | G06F 21/6245 726/28 |
| 2014/0053251 A1* | 2/2014 | Chen | .................... | H04L 63/08 726/6 |
| 2014/0059663 A1* | 2/2014 | Rajshekar | .................... | H04L 63/08 726/6 |
| 2014/0168344 A1* | 6/2014 | Shoemake | .................... | H04M 3/5315 348/14.01 |
| 2014/0189818 A1* | 7/2014 | Meyer | .................... | H04L 63/08 726/4 |
| 2014/0259103 A1* | 9/2014 | Gunasekara | .................... | H04W 12/12 726/2 |
| 2014/0282948 A1* | 9/2014 | Anson | .................... | G06F 21/46 726/6 |
| 2014/0317204 A1* | 10/2014 | Stitt | .................... | G06Q 10/107 709/206 |
| 2014/0379826 A1* | 12/2014 | Hertz | .................... | H04L 51/14 709/206 |
| 2015/0039989 A1* | 2/2015 | Dhanawat | .................... | G06F 40/174 715/226 |
| 2015/0066719 A1* | 3/2015 | Agrawal | .................... | G06Q 40/02 705/35 |
| 2015/0143123 A1* | 5/2015 | Bergqvist | .................... | H04L 63/061 713/171 |
| 2015/0180862 A1* | 6/2015 | Lee | .................... | H04L 63/0838 726/6 |
| 2015/0205858 A1* | 7/2015 | Xie | .................... | G06F 16/3344 707/755 |
| 2015/0215312 A1* | 7/2015 | Cesnik | .................... | H04L 9/3271 726/9 |
| 2015/0235190 A1* | 8/2015 | Urban | .................... | G07F 19/206 705/72 |
| 2015/0248550 A1* | 9/2015 | Alshinnawi | .................... | G06F 21/44 726/19 |
| 2015/0254353 A1* | 9/2015 | Gulwani | .................... | G06F 16/951 707/706 |
| 2015/0276619 A1* | 10/2015 | Chatterton | .................... | G01N 21/95 356/237.2 |
| 2015/0339590 A1* | 11/2015 | Maarek | .................... | H04L 67/02 706/12 |
| 2015/0358328 A1* | 12/2015 | Kaplan | .................... | H04L 67/1095 726/6 |
| 2015/0365401 A1* | 12/2015 | Brown | .................... | H04L 63/083 726/7 |
| 2016/0048298 A1* | 2/2016 | Choi | .................... | H04W 4/029 715/846 |
| 2016/0127357 A1* | 5/2016 | Zibuschka | .................... | H04L 63/0428 726/7 |
| 2016/0140335 A1* | 5/2016 | Proulx | .................... | G06F 21/45 726/6 |
| 2016/0162992 A1* | 6/2016 | England | .................... | G06Q 40/06 705/36 R |
| 2016/0180333 A1* | 6/2016 | Leyva | .................... | G06F 21/41 705/41 |

(56) References Cited

U.S. PATENT DOCUMENTS

| | | | |
|---|---|---|---|
| 2016/0248756 A1* | 8/2016 | Cicchitto | G06F 21/32 |
| 2016/0294804 A1* | 10/2016 | Yamahara | H04L 63/102 |
| 2016/0301533 A1* | 10/2016 | Mishra | H04L 9/3271 |
| 2016/0314173 A1* | 10/2016 | Lydick | G06F 16/24553 |
| 2016/0330150 A1* | 11/2016 | Joe | H04L 51/046 |
| 2016/0350408 A1* | 12/2016 | Lim | G06F 16/3331 |
| 2017/0038847 A1* | 2/2017 | Schorsch | G06F 3/017 |
| 2017/0039566 A1* | 2/2017 | Schipperheijn | G06Q 20/405 |
| 2017/0078251 A1* | 3/2017 | Grubbs | H04L 63/0471 |
| 2017/0084098 A1* | 3/2017 | Rabinowitz | G07C 9/27 |
| 2017/0091288 A1* | 3/2017 | Cohen | G06F 16/951 |
| 2017/0171200 A1* | 6/2017 | Bao | H04L 9/3247 |
| 2017/0177881 A1* | 6/2017 | Krishna | G06F 21/604 |
| 2017/0201386 A1* | 7/2017 | Watson | H04L 9/0866 |
| 2017/0262538 A1* | 9/2017 | Rusinov | G06F 16/904 |
| 2017/0359325 A1* | 12/2017 | Kurian | H04L 63/10 |
| 2018/0115625 A1* | 4/2018 | Livneh | H04L 63/0281 |
| 2018/0161624 A1* | 6/2018 | Wrigg | G09B 19/003 |
| 2018/0167748 A1* | 6/2018 | Vendelbo | H04L 63/123 |
| 2018/0205725 A1* | 7/2018 | Cronkright | H04L 9/3228 |
| 2018/0270221 A1* | 9/2018 | Cicchitto | G06F 21/32 |
| 2019/0066241 A1* | 2/2019 | Budlong | G06F 16/909 |
| 2019/0068381 A1* | 2/2019 | Takemori | H04L 9/006 |
| 2019/0236262 A1* | 8/2019 | Yamada | G06F 21/45 |
| 2020/0028795 A1* | 1/2020 | Tiwary | H04L 47/801 |

FOREIGN PATENT DOCUMENTS

| | | | | |
|---|---|---|---|---|
| JP | 2013097771 A | * | 5/2013 | |
| JP | 2016024529 A | * | 2/2016 | |
| WO | WO-2005057451 A1 | * | 6/2005 | A63F 13/10 |
| WO | WO-2013144423 A1 | * | 10/2013 | G06F 16/2322 |

OTHER PUBLICATIONS

Leung, Chun-Ming. "Depress phishing by CAPTCHA with OTP." In 2009 3rd International Conference on Anti-counterfeiting, Security, and Identification in Communication, pp. 187-192. IEEE, 2009. (Year: 2009).*

Krammer, Viktor. "Phishing defense against IDN address spoofing attacks." In Proceedings of the 2006 International Conference on Privacy, Security and Trust: Bridge the Gap Between PST Technologies and Business Services, pp. 1-9. 2006. (Year: 2006).*

Cocco, Roberto, Maurizio Atzori, and Carlo Zaniolo. "Machine Learning of SPARQL Templates for Question Answering over LinkedSpending." In 2019 IEEE 28th International Conference on Enabling Technologies: Infrastructure for Collaborative Enterprises (WETICE), pp. 156-161. IEEE, 2019. (Year: 2019).*

* cited by examiner

Fig. 2

Counter Challenge Page

User Id

Check two or more boxes below, which will answer your challenge with the letters located in your name at the same positions of checked boxes. This is to protect you from possible phishing attacks.

☐ ☐ ☐ ☐ ☐ ☐ ☐ ☐ ☐ ☐ ☐ ☐ ☐ ☐ ☐ ☐ ☐ ☐ ☐ ☐
1   2   3   4   5   6   7   8   9   10   11   12   13   14   15   16   17   18   19   20

[Challenge]

Fig. 4

A Message form Web Application

Your challenge has been received and an email has been sent to you providing the answer to your challenge. Please check your email and click the link therein to login with your password, only if the answer to your challenge is correct.

Fig. 5

Email Message

Dear Joseph,

We have received your challenge to provide the letters from your name located at the positions 4 and 9. Shown below are the letters that you requested.

```
         e              r
□ □ ⊠ □ □ □ □ ⊠ □ □ □ □ □ □ □ □ □ □ □
1 2 3 4 5 6 7 8 9 10 11 12 13 14 15 16 17 18 19 20
```

— 502

If the above information is correct, then only you are advised to click the following link and login to your account. Any wrong information or inability provide information indicates a phishing attack, and in such a case we advise you not to proceed to login to your account:

https://someservice.com/login.html — 504

Sincerely,
Some Service Team

Counter Challenge Page

User Id: grojos123

Check two or more boxes below which will return you characters from your name located at the same checked positions
☐ ☐ ☐ ☒ ☐ ☐ ☐ ☐ ☒ ☐ ☐ ☐ ☐ ☐ ☐ ☐ ☐ ☐ ☐ ☐
1  2  3  4  5  6  7  8  9  10 11 12 13 14 15 16 17 18 19 20

Check one or more boxes below which will return you characters from your home town located at the same checked positions
☐ ☐ ☒ ☐ ☐ ☐ ☐ ☐ ☐ ☐ ☒ ☐ ☐ ☐ ☐ ☐ ☐ ☐ ☐ ☐
1  2  3  4  5  6  7  8  9  10 11 12 13 14 15 16 17 18 19 20

Check one or more boxes below which will return you characters from your home town located at the same checked positions
☐ Day of birth    ☐ Month of birth    ☒ Year of birth

[Challenge]

Fig. 9

Email Message

Dear Joseph,

We have received your challenge to provide certain information from your personal details. Furnished below is the information as you requested:

Name: (boxes 1-20, with box 4 marked "e" and box 9 marked "r") — 904

Home Town: (boxes 1-20, with box 3 marked "n" and box 10 marked "s") — 906

☐ Day of birth  ☐ Month of birth  ☒ Year of birth  1964 — 908

If the above information is correct, then only you are advised to click the following link and login to your account. Any wrong information or inability to provide information indicates a phishing attack, and in such case we advise you not to proceed to login to your account:

https://someservice.com/login.html — 910

Sincerely,
Some Service Team

Fig. 10

Message on Mobile Phone

Dear Joseph,

Provided below is the answer to your challenge :

The 4$^{th}$ and 6$^{th}$ letters from your name: e and r
The 3$^{rd}$ and 10$^{th}$ letters from your home town: n and s
Year of birth: 1964

Sincerely,
Some Service Team

Counter Challenge Page

User Id [ grojos123 ] — 1202

Answer this challenge  ◯ In Email  ⦿ On Mobile — 1204

Check two or more boxes below which will return you characters from your name located at the same checked positions — 1206

☐ ☐ ☐ ☒ ☐ ☐ ☐ ☒ ☐ ☐ ☐ ☐ ☐ ☐ ☐ ☐ ☐ ☐ ☐ ☐
1  2  3  4  5  6  7  8  9 10 11 12 13 14 15 16 17 18 19 20

Check one or more boxes below which will return you characters from your home town located at the same checked positions — 1208

☐ ☐ ☒ ☐ ☐ ☐ ☐ ☐ ☐ ☐ ☒ ☐ ☐ ☐ ☐ ☐ ☐ ☐ ☐ ☐
1  2  3  4  5  6  7  8  9 10 11 12 13 14 15 16 17 18 19 20

Check one or more boxes below which will return you characters from your home town located at the same checked positions — 1210

☐ Day of birth    ☐ Month of birth    ☒ Year of birth

[ Challenge ] — 1212

— 1200

DEFEATING SOLUTION TO PHISHING ATTACKS THROUGH COUNTER CHALLENGE AUTHENTICATION

FIELD OF THE INVENTION

This invention relates to authentication methods for defeating phishing attacks.

BACKGROUND OF THE INVENTION

Phishing is a kind of attack mounted through a spoofing spam that causes serious data or financial losses to consumer based online businesses. In phishing attack, a fraudulent mass email is sent to a huge count of users, impersonating a target organization with a message to update their personal information such as User Id and password related to a web application, failing which their accounts will be deleted or access to the concerned web application will be blocked. The reason for the sudden requirement of updating personal information is often stated in the phishing mail by the attacker as some enhancement of security applications that has taken place on the web server. Unaware of the trick, many times users submit their personal information, which is directed to a fraudulent server owned by the attacker. Once the attacker captures the personal information on his server, he will use it for fraudulent transactions with the web application. Sometimes, the personal information that a phisher asks for may also include credit card, social security, and bank account numbers.

Phishing attacks usually target users of online banking, payment services such as PayPal, and e-commerce sites such as amazon.com and eBay. Many of the major banks across the world fell victim to phishing attacks at least once. Phishers develop a login web page that exactly looks like that of a target organization, including the logo and images, and send it to target users in an email message, asking them to login immediately to keep their accounts active. Sometimes, they send an email only with a link to the login page that they host on their fraudulent server. Most of the time, the login page is hosted at a URL (universal resource locator) that mostly matches with that of the original, genuine login page, except with a slight difference in the domain name, which is rarely spotted by users.

The consequences of a phishing attack for an online business include direct financial losses caused by fraudulent transactions done with the stolen information, loss of reputation, loss of customers, customer law suits, fall of share holder value, and unexpected expenditure to meet post-attack requirement as per federal regulations.

Phishing has no perfect, simple solution as it is more a social engineering problem than a technical problem. An early approach to contain the phishing problem involved user education with guidelines such as for not responding to emails asking for any personal information, verifying of URLs while furnishing login credentials in any web page, and verifying the IP (internet protocol) address of the sender of an email. However, despite the above approach, phishers continued to be successful in targeting online web application users and stealing valuable personal information.

Utilizing a URL masking vulnerability of the Internet Explorer (trademarked) browser discovered in 2003, phishers used to cheat web application users and steal their personal information. Later, in the wake of growing phishing attacks, some commercial service companies emerged in the market, with a service offering to constantly monitor a domain name system, and registrars to spot domain names that spell closer to existing domain names and are used to launch duplicate websites to cheat customers. As and when such counterfeit domains are identified, the original domain owners are informed of the potential threat. Also, anti-spam service providers offered to scan emails for potential phishing attacks and report them to the targeted companies. However, these approaches are reactive in nature and can only lower the impact of a phishing attack by alerting a company of phishing attacks already in progress.

Two factor authentication is another approach introduced by product based security companies. This approach requires that users of an online web application use a second factor of authentication such as a hardware token or smart card provided by the application owner. After a user submits his login credentials for authentication, the web application further prompts him to enter a number that his hardware token generates or enter his smart card in the reader slit of his computer. Though this approach provides a definitive solution to phishing attacks, it carries its own disadvantages such as high hardware token cost, client software installation, high management costs and user education requirements.

Another approach to spotting phishing attacks is comparing a mail server IP address with the envelope sender domain name. However, the envelope sender domain name can be spoofed to fool users, and the comparison task is not easy for a layman without much knowledge of domain names and IP addresses. One more approach that has been tried by corporations to contain phishing attacks is digitally signed emails wherein the sender attaches his digital signature to his email. However, as a phisher also could have digitally signed with his valid digital signature, it requires the recipient to verify and identify the phisher's misleading domain name.

Yahoo! (trademarked) has its own solution to phishing attacks. A user of its email service can select his seal that will be displayed on the login page whenever he opens the login page. However, the seal appears only on the computer that is used to select the seal. When the user switches to another computer, the seal management application can not detect the user and identify his seal.

The shortcomings of all the solutions discussed above for phishing call for a more simpler, technical, computer-independent solution to phishing, without demanding additional hardware, software, and education on the part of end users.

SUMMARY OF THE INVENTION

One or more embodiments of the present invention relate to a defeating method and system for phishing attacks. It provides a simple, computer-independent, technical method for defeating phishing attacks, without requiring any education on the part of users.

The method utilizes a counter challenge authentication mechanism to overcome the phishing problem. As it is clear to web application users, authentication is a process wherein a web application challenges a user to prove that he is really a registered user holding an account with the application. In order to meet the challenge, the user enters his User Id (identification) and Password in the login page and submits it to the web application. Subsequently, the web application verifies if the user credentials received already exist in its user database. If the verification proves the user to be a registered user, he is allowed access to the web application, else access is denied. This mechanism of straight authentication was developed in the early stages of web technology when no one could foresee phishing attacks as a daunting future problem. Today, this straight authentication mechanism has proved inefficient to thwart phishing attacks.

Counter challenge authentication is an advanced authentication method enabling users to safely login to web applications, without falling prey to phishers. In this method, a user poses a counter challenge to a web application through a challenge page opened in the user's browser. The challenge page comprises an input box for User Id, a message below the input box asking the user to pose a challenge by requesting certain information from his personal details corresponding to the input provided by him through a number of input elements. The input for a challenge may be provided by selecting one or more check boxes of a set of check boxes available in the challenge web page. In a generic sense, input may also be provided by selecting items from a number of drop-down lists, clicking a number of buttons, filling one or more input boxes or clicking one or more images available in the challenge web page. The selected items, clicked buttons, images, or the information filled in the boxes represent the characters or values that the user requests from the web application in his or her challenge. The web application will return in response, the letters or values from the user's personal details. For instance, if a user checks the $4^{th}$ and $7^{th}$ check boxes in a set of check boxes representing the user's name, the response from the web application will return $4^{th}$ and $7^{th}$ letters from the user's name as registered with the web application, in an email to the user's email address or to his mobile phone. The message in the email or the message to the mobile phone advises the user to proceed to login only in case the answer provided to the challenge is correct. The email message sent to the user comprises a link to the safe login page which he is supposed to click only if the answer provided to his challenge is correct. When a message is sent to a user's mobile phone, the user is supposed to verify the correctness of the answer provided to the user's challenge and then enter the user's password in a web page which could be the same web page used for counter challenge or a different one. The counter challenge page may also provide an option to the user as to where he or she wishes to receive the answer to his or her challenge. The user may indicate their choice as email or mobile phone through a couple of radio buttons or similar user interface elements provided in the challenge page.

The concept of counter challenge and providing an answer to the counter challenge protects a user from phishing attacks as the user refrains from submitting their password, if the web application fails to provide the correct answer to their challenge. A fraudulent web application of a phisher will be unable to correctly answer a user's challenge as it lacks the required information to meet the challenge. Any failure to respond to user's challenge or incorrectness of response is a clear indication of a phishing attack. Only the genuine web application can answer the user's challenge as it has all details of the user collected and stored at the time of registration. This simple technique of counter challenge authentication inherently includes a defeating mechanism against phishing attacks.

Counter challenge authentication can be implemented in a single login page also using AJAX (short for asynchronous JavaScript (trademarked) and XML (extensible markup language)), scripting DHTML (Dynamic Hypertext Markup Language) techniques. In such an implementation, the login page comprises an input box for user id, a series of check boxes or other input elements, and a "Challenge" button in visible form. Another input box for password and a Login button are also embedded in the same login page in hidden form. A user enters their user id, selects some check boxes or input elements available in the login page, and then clicks the "Challenge" button. The web application responds to the challenge in the same page with an answer, and at the same time the hidden password box and the Login button are made visible on the page, while hiding the Challenge button. The web application also displays a message on the same login page to enter password only if the answer to the challenge is correct.

An advantage of a counter challenge authentication technique is it does not require any user education, and it only requires that users read the messages and act accordingly during the process of authentication. A user is required only to verify the answer to the user's challenge from the web application for its correctness every time the user logs into the user's account, in order to rule out any incidence of phishing attack.

Another advantage of this authentication technique is it is computer independent, unlike a user-seal based solution to phishing. It enables users to login to their accounts through any computer, irrespective of its IP address and geographic location, thereby eliminating dependency on one's own personal or regular usage computer.

Further, this authentication technique eliminates dependency on client software installations and digital signatures. Counter challenge authentication works as an alternative to expensive hardware tokens, thereby avoiding cost and maintenance issues. Post attack panic and cost of meeting legal procedural requirements can be kept away with this technique.

DETAILED DESCRIPTION OF THE DRAWINGS

Figure 1:
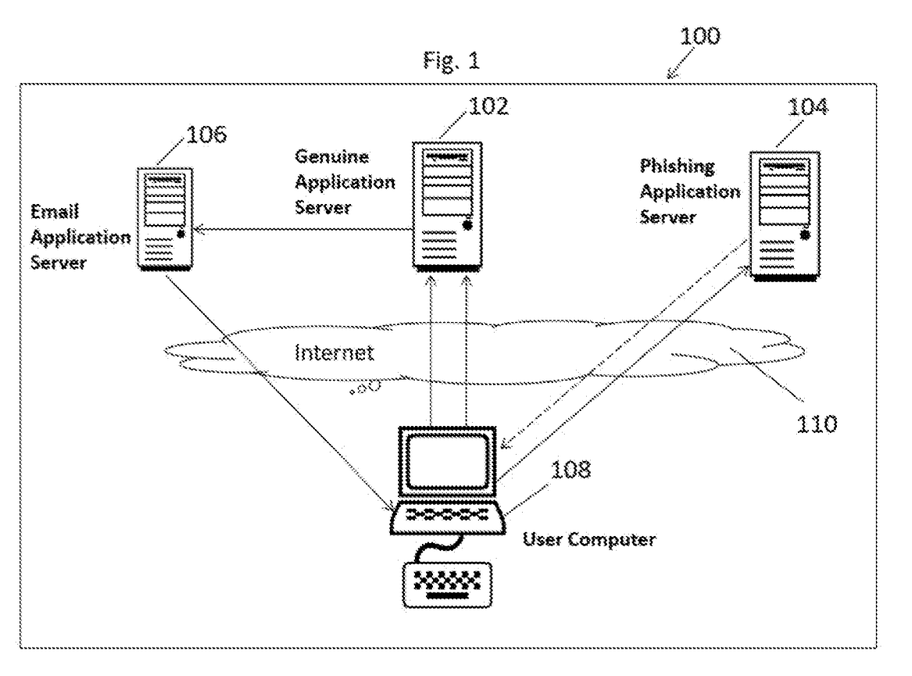
FIG. 1 shows an apparatus for use with an embodiment of the present invention.

FIG. 1 shows a simplified diagram of an apparatus 100 for use in accordance with an embodiment of the present invention. The apparatus 100 may include a genuine application server computer 102 hosting a genuine web application computer software program, a phishing server computer 104 hosting a phishing web application computer software program, an email application server computer 106 of an email service provider, and a user computer 108 that may communicate to the server computers 102, 104, and 106 through the Internet 110.

Figure 2:
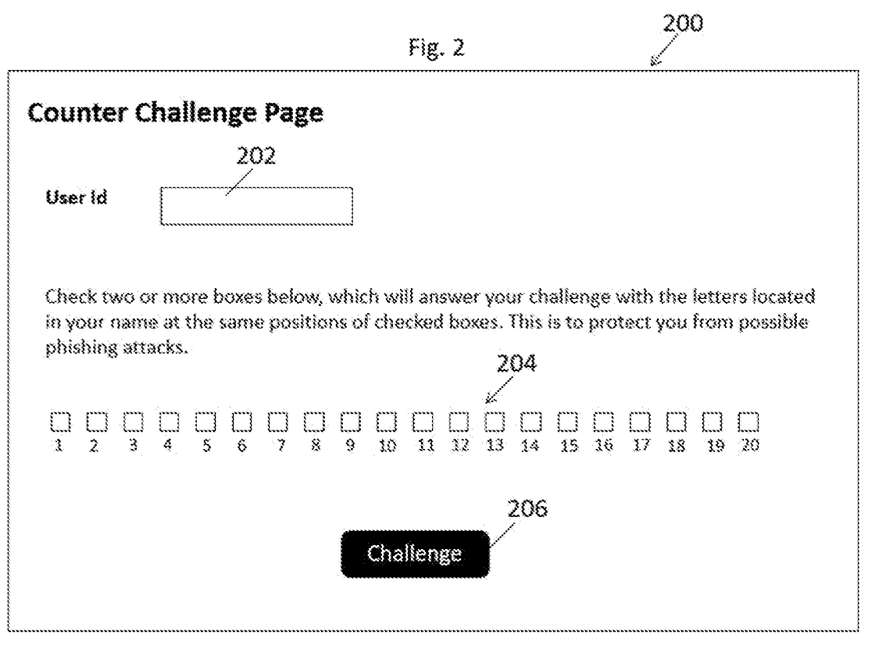
FIG. 2 shows a counter challenge page used in the authentication process, in accordance with an embodiment of the present invention.

FIG. 2 shows a counter challenge web page 200 that may be used in the first step of the authentication process. The web page 200 may be stored on the genuine application server computer 102 and displayed on the user computer 108 when a user types its URL in his or her browser. The counter challenge web page comprises an input box 202 for entering User Id and a message below the input box which reads "Check two or more boxes below, which will answer your challenge with the letters located in your name at the same sequence positions of the checked boxes. This is to protect you from possible phishing attacks". Provided below the message are a series of check boxes 204, which have numbers "1" through "20" located beneath the check boxes 204, one number for each check box. A user may enter his or her user id in the input box 202 and check two or more of the boxes out of the series of check boxes 204 and then click the Challenge button 206, which will submit the counter challenge web page to the genuine server computer 202.

Figure 3:
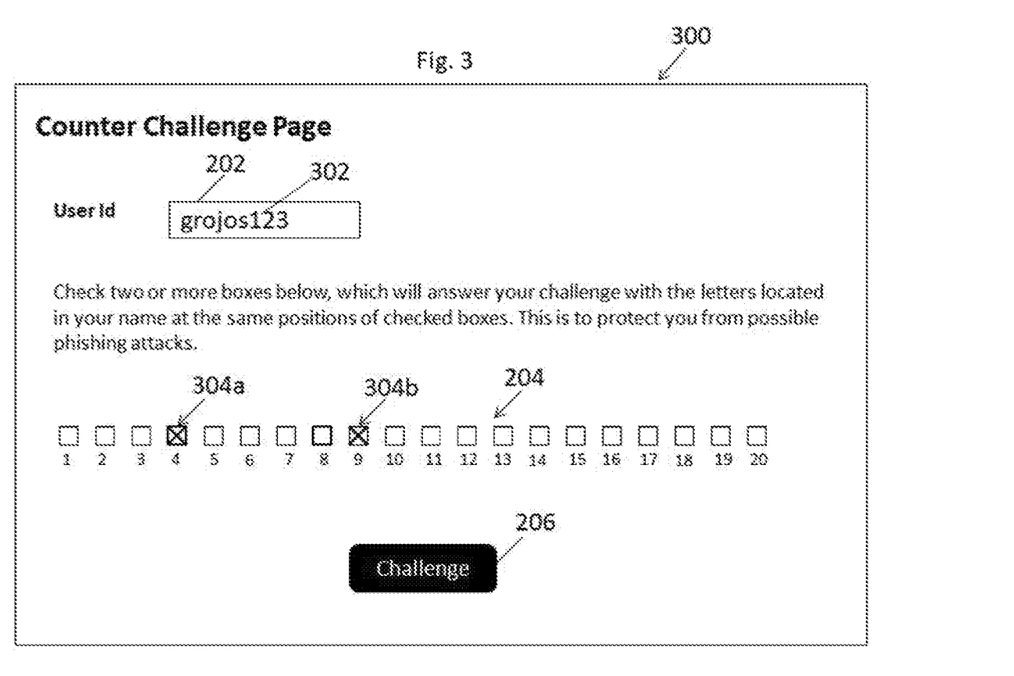
FIG. 3 shows a counter challenge page used in the authentication process filled with some user input, in accordance with an embodiment of the present invention.

FIG. 3 shows a login challenge web page 300, which is a filled in version of the webpage 200. The web page 300 includes content 302 which is "grojos123" which has been entered into the input box 202. The web page 300 also includes "X" mark 304a and "X" mark 304b, which have been filled into check boxes above the number "4" and above the number "9" of the check boxes 204. A user named Joseph Grover, whose user id is "grojos123" may have filled in the input box 202 and the two check boxes of 204 as shown in FIG. 3. After entering a user id in box 202 and checking two or more boxes of the check box series 204, the user should click the challenge button 206 to submit the page to the genuine application server computer 102 of the apparatus 100 of FIG. 1.

Figure 4:
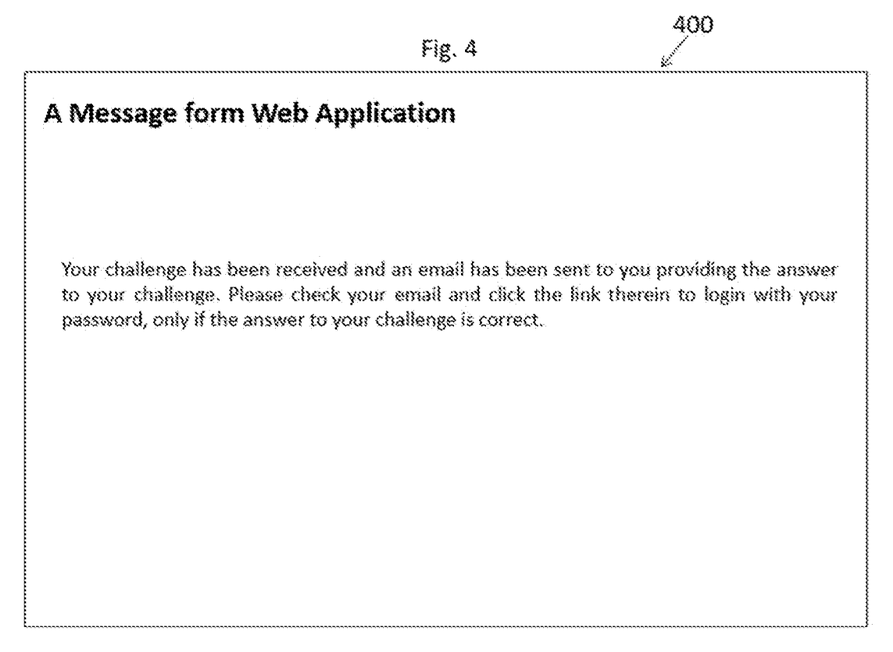
FIG. 4 shows a message sent to a user from a web application in the authentication process, in accordance with an embodiment of the present invention.

FIG. 4 shows a web page or image 400 including a message that the user receives on a user computer monitor of the user computer 108 after the user submits the filled in login page 300 of FIG. 3 with the user's username and checked boxes. The message indicates that the user's challenge has been received and an email has been sent to the user's email address providing the answer to the user's challenge and further advising the user to check the user's email and click the link therein to login with the user's password, only if the answer to the user's challenge is correct.

Figure 5:
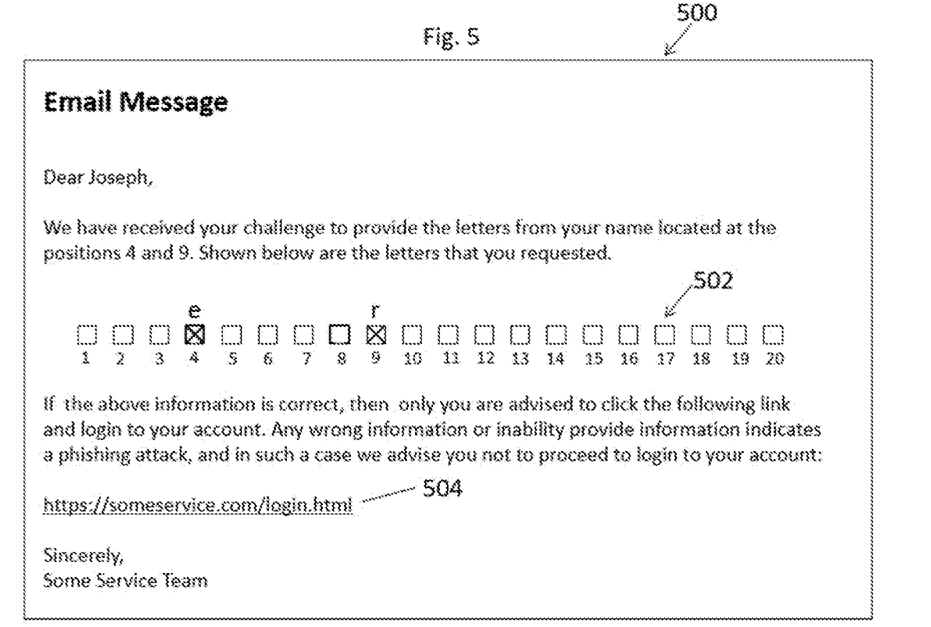
FIG. 5 shows a message sent to a user's email address in response to the user's challenge, in accordance with an embodiment of the present invention.

FIG. 5 shows a web page or image 500, including an email message that a user receives at the user's email address such Gmail (trademarked), Hotmail (trademarked), Yahoo Mail (trademarked) etc., that the user specified at the time of registration with the genuine web application computer program. The email provides an answer to the challenge of a user named "Joseph Grover" as posed in the web page or image 300 of FIG. 3 for providing certain information from his personal details that were furnished at the time of registration with the web application computer software program. The letters e and r shown above the $4^{th}$ and $9^{th}$ check boxes of check boxes are the $4^{th}$ and $9^{th}$ letters extracted from the user's name as recorded in the user database of the genuine web application computer software program. The message advises the user to proceed to login to the web application, only in case the information provided is correct. The user is alerted that any wrong information or missing of requested information is indicative of a possible phishing attack and thereby advised to refrain from login process. The email message also provides a link 504 near the bottom of web page or image 500 by clicking which the user can open a safe login page.

Figure 6:
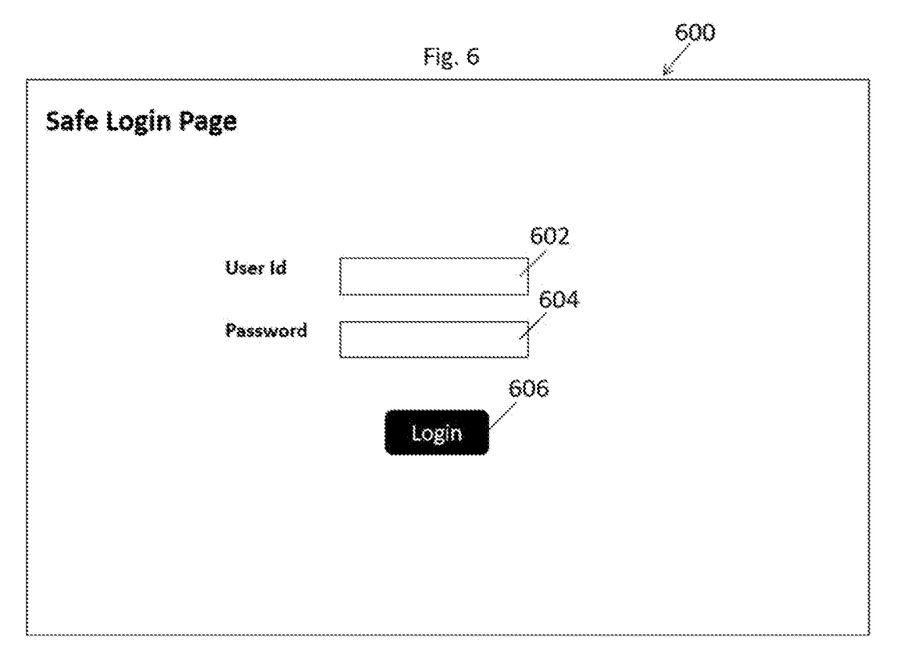
FIG. 6 shows a safe login page displayed after answering a users challenge, in accordance with an embodiment of the present invention.

FIG. 6 shows a safe login web page or image 600 that may be used to login to the genuine web application computer software running on the genuine application server computer 102 of apparatus 100 shown in FIG. 1. The safe login web page 600 may be stored on the genuine application server computer 102 and displayed on a computer monitor of the user computer 108 of apparatus 100 shown in FIG. 1. The safe login web page 600 contains an input box 602 for entering username and another input box 604 for entering a password. It also contains a login button 606 which a user clicks after entering his user id and password. Once a user clicks the login button 606, his login credentials are submitted to the genuine web application server computer 102 for authentication and allows access to the application computer software if the credentials are found to be valid. The safe login page 600 may also be displayed only with items 604 and 606 without the input box 602 for entering a user id. The user's user id may be carried as part of the query string in the URL of the safe login page 600.

Figure 7:
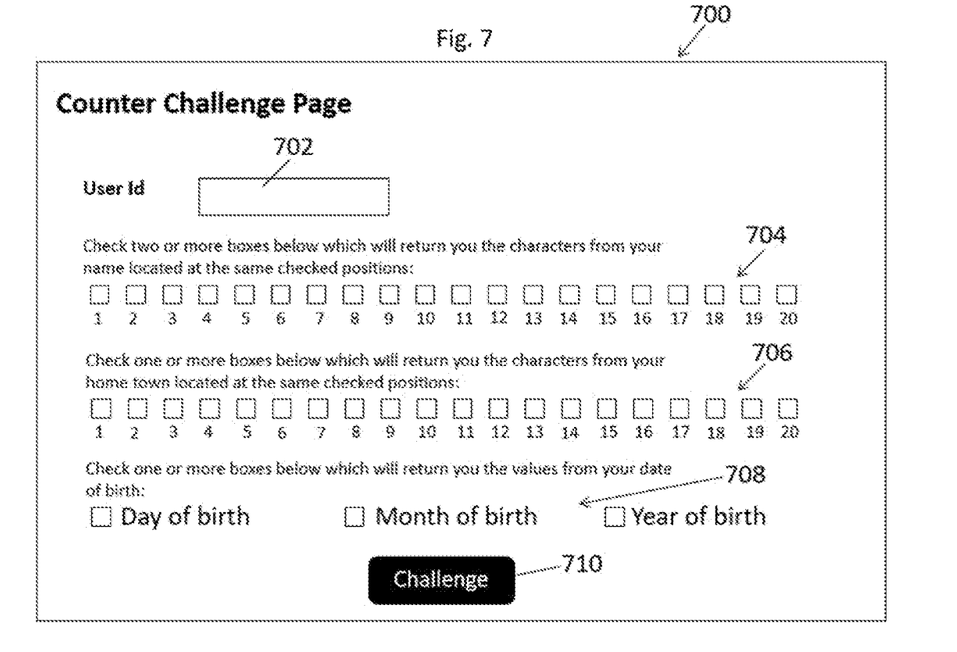
FIG. 7 shows a counter challenge page allowing a user to request information from multiple user details, in accordance with an embodiment of the present invention.
Figure 8:
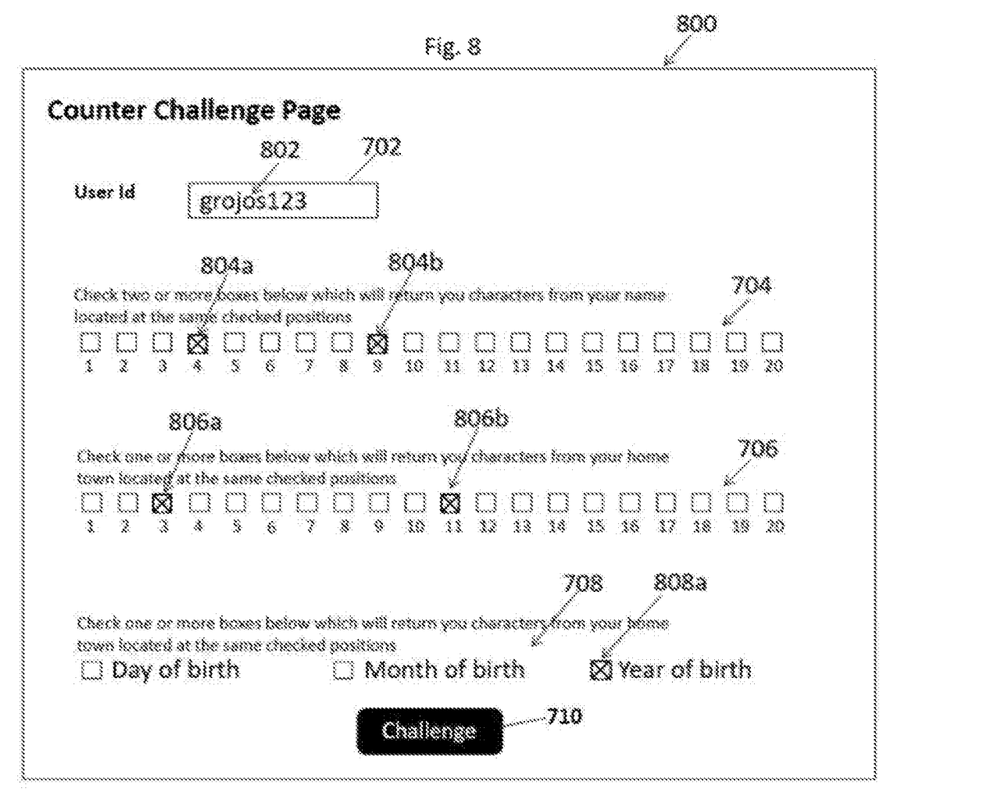
FIG. 8 shows a counter challenge page wherein a user requests information from multiple user details, in accordance with an embodiment of the present invention.

FIG. 7 shows a counter challenge web page or image 700 which allows a user to select check boxes from two or more check box groups. Each group of check boxes represents a unique personal detail such as user's name, home town, date of birth etc. Other details that may be included in the counter challenge web page 700 are street of address, email address etc. In a broader sense, the web page 700 may include check box groups, or even drop down boxes, representing any chunk of a user's personal details that are collected from the user at the time of registration. The counter challenge page 700 comprises an input box 702 for user Id, a set of check boxes 704 representing the letters of the user's full name as furnished at the time of registration. The login challenge page 700 also comprises a set of challenge boxes 706 representing the letters in the user's home town and another set of check boxes 708 representing the date of birth details of the user. Item 710 of the login challenge page or image 700 is a challenge button 710 that a user may click after selecting check boxes from the check box sets 704, 706 and 708. Incorporating two or more sets of check boxes or other input elements in the counter challenge web page enormously increases the permutations of letters and numbers that need to be sifted through to answer the challenge, thereby significantly strengthening the security of login transactions against phishing attacks. FIG. 8 shows a counter challenge web page 800, which is a filled in version of the webpage 700. The web page 800 includes content 802 which is "grojos123" which has been entered into the input box 702. The web page 800 also includes "X" mark 804a and "X" mark 804b, which have been filled into check boxes above the number "4" and above the number "9" of the check boxes 704. A user named Joseph Grover, whose user id is "grojos123" has filled in the input box 702 and the two check boxes of 704 as shown in FIG. 8. In FIG. 8, the user has also checked boxes above the number "3" and the number "11" for check boxes 706, and the check box for "Year of Birth" of check boxes 708. Once a user fills their user id in the input box 702 and checks some check boxes from different sets of check boxes 704, 706 and 708, the user clicks the Challenge button 710, which will submit the challenge information to the genuine web application on the genuine application server 102 shown in image 100 of FIG. 1.

Figure 9:
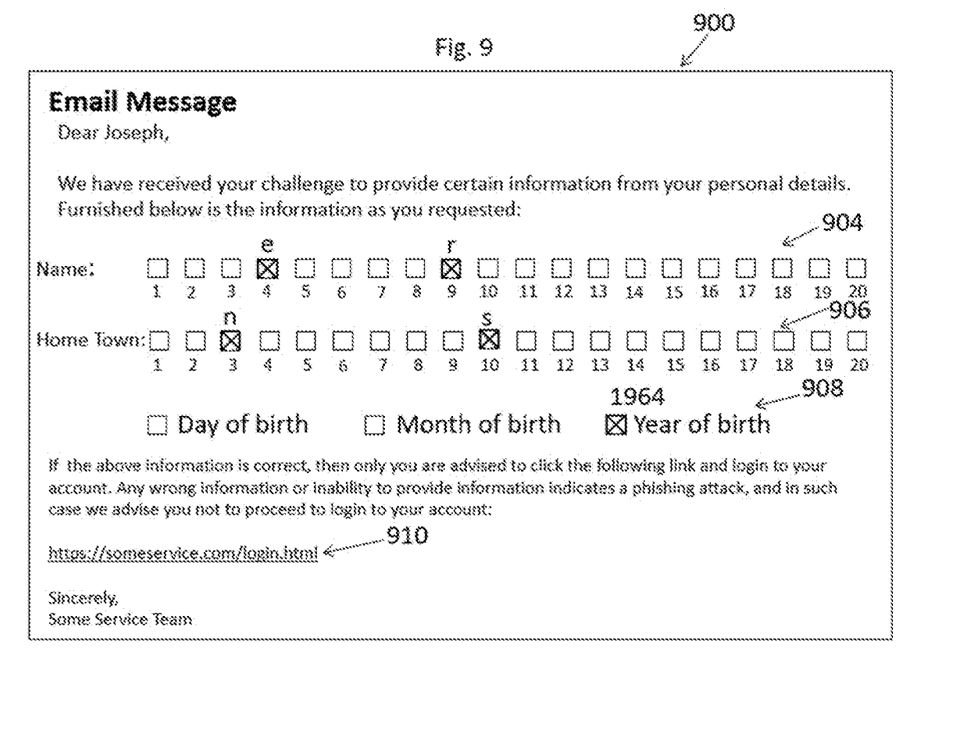
FIG. 9 shows an email message sent to a user's email address providing information from multiple user details, in accordance with an embodiment of the present invention.

FIG. 9 shows a web page or image 900 of an email response to a user comprising an answer to the user's challenge. The letters e and r shown above the $4^{th}$ and $9^{th}$ check boxes of plurality of check boxes 904 indicate the 4th and $9^{th}$ letters of the user's name as available in the user database on the genuine application server computer 102 of the apparatus 100 shown in FIG. 1. Similarly, letters n and s shown above the $3^{rd}$ and $10^{th}$ check boxes of the plurality of check boxes 906 indicate the $3^{rd}$ and $10^{th}$ letters of the user's home town that he requested in his challenge as shown in the web page or image 800 of FIG. 8. Further, the number "1964" shown above the Year of birth check box of item 908 indicates the year of birth of the user as requested in his challenge. The user is advised to click the link 910 to the safe login page provided in the email message of web page or image 900, only if the user finds the answer to the user's challenge correct. Any incorrect or missing information is a clear indication of a phishing attack.

Figure 10:
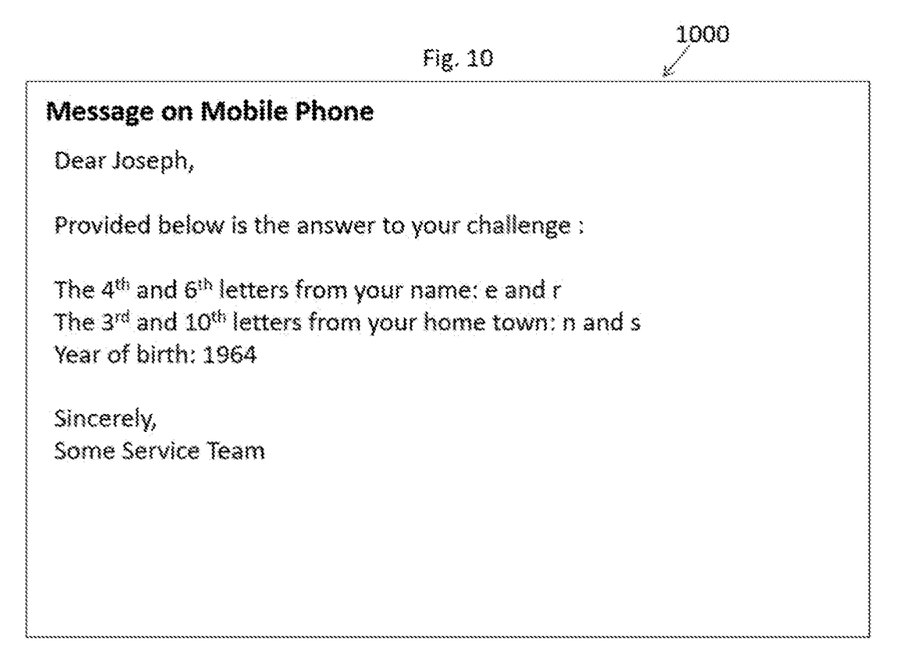
FIG. 10 shows a message sent on a user's mobile phone proving answer to the user's challenge, in accordance with an embodiment of the present invention.

FIG. 10 shows a web page or image 1000 including a message received on a user's mobile phone providing an answer to the user's challenge. The message of the image 1000 answers e and r as the $4^{th}$ and $6^{th}$ letters of the user's name, and n and s as the $3^{rd}$ and $10^{th}$ letters of the user's home town. Further, the message answers "1964" as the "Year of birth" of the user.

Figure 11:
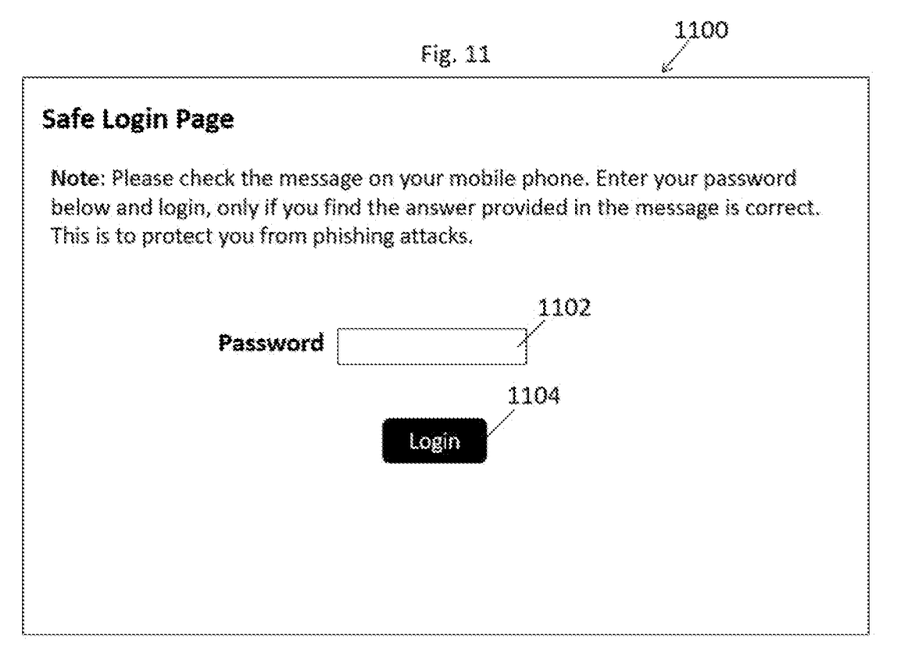
FIG. 11 shows a safe login page displayed on a user computer after answering the user's challenge, in accordance with an embodiment of the present invention.

FIG. 11 shows a safe login web page or image 1100 comprising a password input box 1102 and a login button 1104 which submits the page to the genuine application server computer 102 shown in the apparatus 100 of FIG. 1 for authentication when clicked. The login page 1100 also shows a message at the top for the user to verify the message sent on his mobile phone. The message further advises the user to enter password into input box 1102 only if the answer provided to his challenge is correct.

Figure 12:
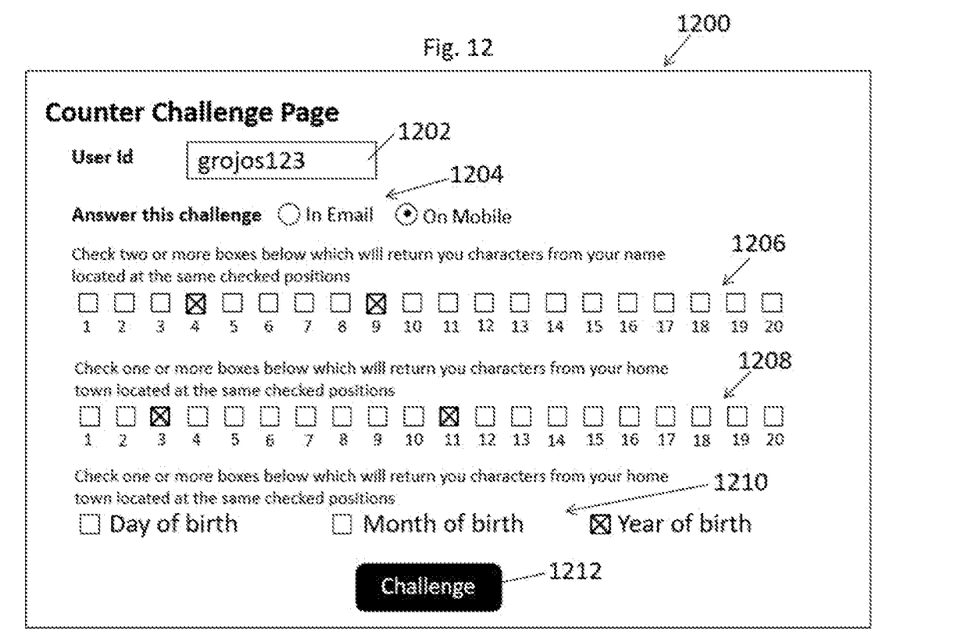
FIG. 12 shows a counter challenge page with an option to receive an answer to a user's challenge displayed on a user computer after answering the user's challenge, in accordance with an embodiment of the present invention.

FIG. 12 shows a counter challenge web page or image 1200 wherein a user is provided the choice to select where the user wishes to receive the answer to the user's challenge. The choice may be indicated by selecting one of the radio buttons of item or field 1204. Depending upon whether the user wants to bear the cost of a mobile message or not, the user may select his choice from email and mobile message. For login transactions into financial service applications, it is worth receiving the answer to a challenge on the user's mobile phone. The web page or image 1200 includes check boxes 1206 and check boxes 1208. The $4^{th}$ and $9^{th}$ boxes of check boxes 1206 have been checked and/or have an "X" entered in them. The $3^{rd}$ and $11^{th}$ boxes of check boxes 1208 have been checked and/or have an "X" entered in them. The web page or image 1200 also includes item or set of check boxes 1210 for "Day of birth", "Month of birth", and "Year of birth".

In accordance with at least one embodiment of the present invention, the method of counter challenge authentication can be used in many other ways than the one described above. Instead of requesting letters from a user's name, they can be requested from other details of a user, such as the user's mother's maiden name, university of graduation or any other personal detail that was furnished and stored in a user database at the time of registration. Further, to make the request of letters complicated, a user may be enabled to request letters from different chunks of user details.

The possibility of successfully phishing users of web applications with counter challenge authentication by answering challenges with random letters or values has been studied. The study reveals that the chances of success for such a smart phisher are negligible when the number of requested letters is two, and gets close to none as the number increases. The following table shows probability figures of a phisher's success with respect to the number of letters requested in the challenge of authentication.

TABLE 1

Probability figures of successful phishing attack

| Number of requested letters | Probability of successful phishing attack |
| --- | --- |
| 2 | 1/26**2 = 0.00148 |
| 3 | 1/26**3 = 0.00006 |
| 4 | 1/26**4 = 0.000002 |
| 5 | 1/26**5 = 0.000000084 |

The above figures were calculated based on the assumption that users' names are always permutations of 26 letters of the English alphabet. However, numbers, period, white space and uppercase letters are not considered in computing the above figures, which may further curtail the success chances of a phisher.

One or more embodiments of the present invention will be very useful for e-commerce applications, e-banking systems, email services, web hosting services, and all other web applications that require user authentication.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method comprising:
   receiving a user identification for a user into a user computer;
   sending the received user identification from the user computer to a web application computer program via the internet;
   providing an input menu on the user computer, configured to allow the user to select any one valid challenge question of a plurality of valid challenge questions presented on the input menu simultaneously;
   receiving, at the user computer, the user's selection of the any one valid challenge question of the plurality of valid challenge questions;
   sending the any one valid challenge question for the user from the user computer to the web application computer program via the internet;
   receiving an answer at the user computer to the any one valid challenge question from the web application computer program via the internet; and
   logging into the web application computer program by supplying a password to the web application computer program only if the answer is determined to be a correct answer to the any one valid challenge question;

wherein each valid challenge question of the plurality of valid challenge questions has a correct answer, such that there are a plurality of correct answers, one for each of the plurality of valid challenge questions;

wherein the correct answer to at least one of the plurality of valid challenge questions is a specific letter of a specific word of one or more words providing personal details about the user, wherein the specific letter of the specific word is not a first letter of the specific word;

wherein the correct answer to the at least one of the plurality of valid challenge questions is received at the user computer and displayed on the user computer without the first letter of the specific word; and wherein the correct answer to the at least one of the plurality of valid challenge questions is received at the user computer and displayed on the user computer with a link which is configured to be clicked on to login into the web application computer program.

2. The method of claim 1 wherein
the correct answer to the at least one of the plurality of valid challenge questions is received in an email.

3. The method of claim 1 wherein
the answer is received on a first web page and the password is entered in the first web page.

4. The method of claim 1 wherein
the correct answer to the at least one of the plurality of valid challenge questions is received on a user's mobile phone.

5. The method of claim 1 wherein
the answer is received either in a user's email or on his mobile phone based on a user's choice made on a challenge web page.

6. The method of claim 1 wherein
the challenge comprises a request to provide a plurality of letters, wherein each of the plurality of letters is positioned at particular sequence numbers, and wherein the plurality of letters correspond to personal details about the user;

the challenge further comprises a request to provide a particular complete word separate from the plurality of letters, wherein each of the plurality of letters is provided without a complete word; and wherein the particular complete word is received at the user computer and displayed on the user computer at the same time as, but separate from each of the plurality of letters.

7. The method of claim 6 wherein
the personal details include a user name.

8. The method of claim 6 wherein
the personal details include a street address.

9. The method of claim 6 wherein
the personal details include a mother's maiden name.

10. The method of claim 6 wherein
the personal details include an email address.

11. The method of claim 6 further comprising
providing the plurality of letters requested by a plurality of checked boxes.

12. The method of claim 6 further comprising
providing the plurality of letters requested by selections of drop down lists.

13. The method of claim 6 further comprising
providing the plurality of letters requested by one or more button clicks.

14. The method of claim 6 further comprising
providing the plurality of letters requested by entering numbers in text boxes provided in a challenge web page.

15. The method of claim 1 wherein
the challenge question comprises a request to provide at least part of the user's date of birth.

16. The method of claim 1 wherein
the challenge question comprises a request to provide information from two or more personal details of the user.

17. The method of claim 1 wherein
the answer includes an indication of which of the plurality of valid challenge questions has been selected by the user.

18. The method of claim 17 wherein
the answer includes the input menu.

19. An apparatus comprising
one or more computer processors; and
one or more non-transitory computer-readable mediums having instructions stored therein for programming the one or more computer processors to implement a process in a web application computer software program that requires authentication of a user, the process including:

receiving a user identification for a user into a user computer;

sending the received user identification from the user computer to a web application computer program via the internet;

providing an input menu on the user computer, configured to allow the user to select any one valid challenge question of a plurality of valid challenge questions presented on the input menu simultaneously;

receiving, at the user computer, the user's selection of the any one valid challenge question of the plurality of valid challenge questions;

sending the any one valid challenge question for the user from the user computer to the web application computer program via the internet;

receiving an answer at the user computer to the any one valid challenge question from the web application computer program via the internet; and logging into the web application computer program by supplying a password to the web application computer program only if the answer is determined to be a correct answer to the any one valid challenge question;

wherein each valid challenge question of the plurality of valid challenge questions has a correct answer, such that there are a plurality of correct answers, one for each of the plurality of valid challenge questions;

wherein the correct answer to at least one of the plurality of valid challenge questions is a specific letter of a specific word of one or more words providing personal details about the user, wherein the specific letter of the specific word is not a first letter of the specific word;

wherein the correct answer to the at least one of the plurality of valid challenge questions is received at the user computer and displayed on the user computer without the first letter of the specific word; and wherein the correct answer to the at least one of the plurality of valid challenge questions is received at the user computer and displayed on the user computer with a link which is configured to be clicked on to login into the web application computer program.

\* \* \* \* \*